Jan. 6, 1925.

A. C. MAY

DOUGH DIVIDING MACHINE

Filed Oct. 21, 1922     4 Sheets-Sheet 1

INVENTOR.
Arthur Charles May.

INVENTOR.
Arthur Charles May.

Jan. 6, 1925.

A. C. MAY 1,522,021

DOUGH DIVIDING MACHINE

Filed Oct. 21, 1922     4 Sheets-Sheet 3

INVENTOR.
Arthur Charles May.

Jan. 6, 1925.

A. C. MAY

1,522,021

DOUGH DIVIDING MACHINE

Filed Oct. 21, 1922  4 Sheets-Sheet 4

INVENTOR.
Arthur Charles May.

Patented Jan. 6, 1925.

1,522,021

UNITED STATES PATENT OFFICE.

ARTHUR CHARLES MAY, OF SAGINAW, MICHIGAN, ASSIGNOR TO JOSEPH BAKER SONS & PERKINS COMPANY, INCORPORATED, OF WHITE PLAINS, NEW YORK.

DOUGH-DIVIDING MACHINE.

Application filed October 21, 1922. Serial No. 596,044.

*To all whom it may concern:*

Be it known that I, ARTHUR CHARLES MAY, a citizen of the United States, residing at Saginaw, in the county of Saginaw and State of Michigan, have invented new and useful Improvements in Dough-Dividing Machines, of which the following is a specification.

This invention relates to machines for dividing a mass of dough or similar material into portions having predetermined size and weight, and is herein shown as embodied in a machine in which a mass of dough separated from a larger mass contained in a hopper is forced by a ram into a plurality of measuring and shaping cells carried by a reciprocating slide which operates to move the cells between cell charging relation to the ram and a position in which the cells may be discharged, but it will be understood that the invention is not restricted to the illustrated embodiment and that many features of the invention are of general utility in the art to which it relates.

A general object of the invention is to insure the rapid, certain and uniform operation of a machine of this type and to avoid liability to breakage with the incident loss of time and waste of materials which result therefrom in the business in which machines of this type are particularly intended to be used. The invention also has for its object considerably increased efficiency, accuracy and cleanliness in working and greater simplicity of construction as well as safety against accident, breakage or damage.

Important features of the invention are the provision of novel means for lubricating certain of the parts, the provision of means for insuring the successive discharge and proper spacing upon a conveyor of the formed portions of dough produced by the machine, and the provision of driving connections releasable under predetermined resistance to prevent breakage of parts of the machine.

I obtain these objects by the various new and improved devices, contrivances, their combinations and arrangements explained in the following description, and clearly defined in the claims. The preferred form of the invention is illustrated in the accompanying drawings, which represent a machine for dividing dough into buns.

Like numerals of reference denote in all figures like parts serving the same or a similar purpose.

The reference numeral 1 indicates the framework supporting the various parts of the machine, 2 the hopper containing the dough to be divided and arranged on the top of the machine, 3 the dough compression box underneath the hopper 2, 5 the shutter reciprocating between the latter and the box 3, 6 the ram working the dough compression box, 7 the division block containing the measuring cells 8, and 9 the conveyer on which the single measured dough pieces, after removal from the cells 8, are carried away from the machine to their farther destination.

Figure 5:
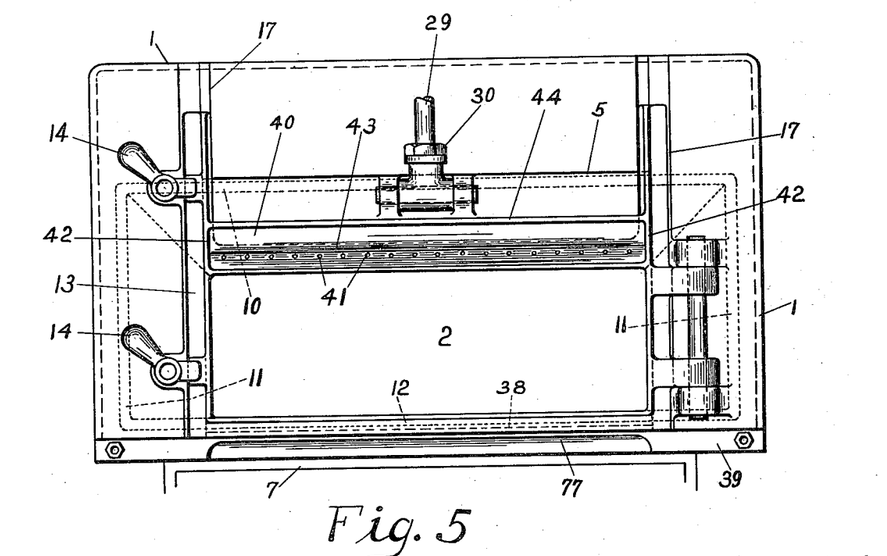
Fig. 5 is a plan view of the hopper (top in dotted lines), the dough compression box and the shutter, showing the oiling devices for the latter and for the front of the division block.
Figure 6:
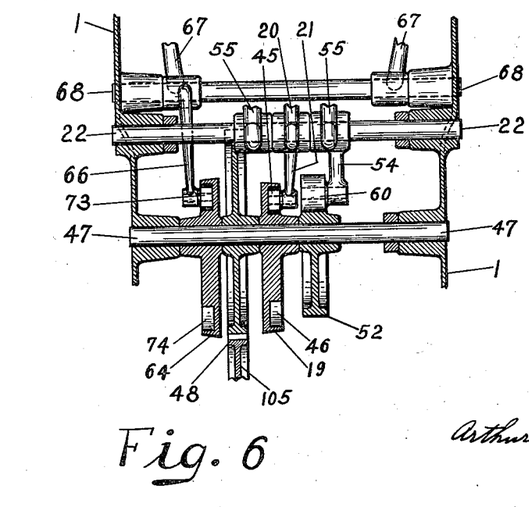
Fig. 6 is a fragmental vertical section illustrating the arrangement of the cams on the camshaft.

The hopper 2 is a square box wider at the top than at the bottom, the back wall 10 and the two side walls 11 slanting inside and downwards to the bottom, while the front wall 12 is nearly vertical; the bottom is quite open and surrounded by the rim 13. The hopper 2 turns on hinges provided on the framework 1, and is fastened thereon by means of the latch and handle 14, (Fig. 5).

The dough compression box 3 is open at the top and about as wide as the open bottom of the hopper 2; its two side walls 15 and its bottom 16 are solid and are fixed to or form part of the framework 1. The back of the box 3 is always closed by the ram 6; the open top is alternately closed and connected with the open bottom of the hopper 2 by the shutter 5, and the open front is alternately closed by the solid part of the division block 7 and opposed to the open measuring cells 8 of the latter.

The shutter 5 is reciprocated on top of the box 3, underneath the bottom rim 13 of the hopper 3 and between the guides 17, forming part of the framework 1, by means of the lever 18 worked by the cam 19. The lever 18 has a lower arm 20 and an upper arm 21 and turns round the shaft 22, rotatably mounted in the framework 1, as a fulcrum. As shown more particularly in Figs. 7 and 8 arm 21 ends in the fork 23 consisting of two reenforced branches provided with openings 24 directly opposite to and in line with each other, the axis of which is at right angles to the line of direction in which the shutter 5 moves. Pins 25, provided with the heads 26 and turning closely, but easily in the openings 24, are fixed with their ends, protruding from inside the fork, in the short bosses 27 provided at opposite sides of the tube 28 extending between the branches of the fork 23. The rod 29, sliding in the tube 28, serves to connect the fork 23 and thereby the lever 18 with the shutter 5 and is for this purpose screwed at one end in the tube 30 hinged onto the back of the latter, while the other end is fixed in the tube 28.

Figures 7, 8, 9, 10:
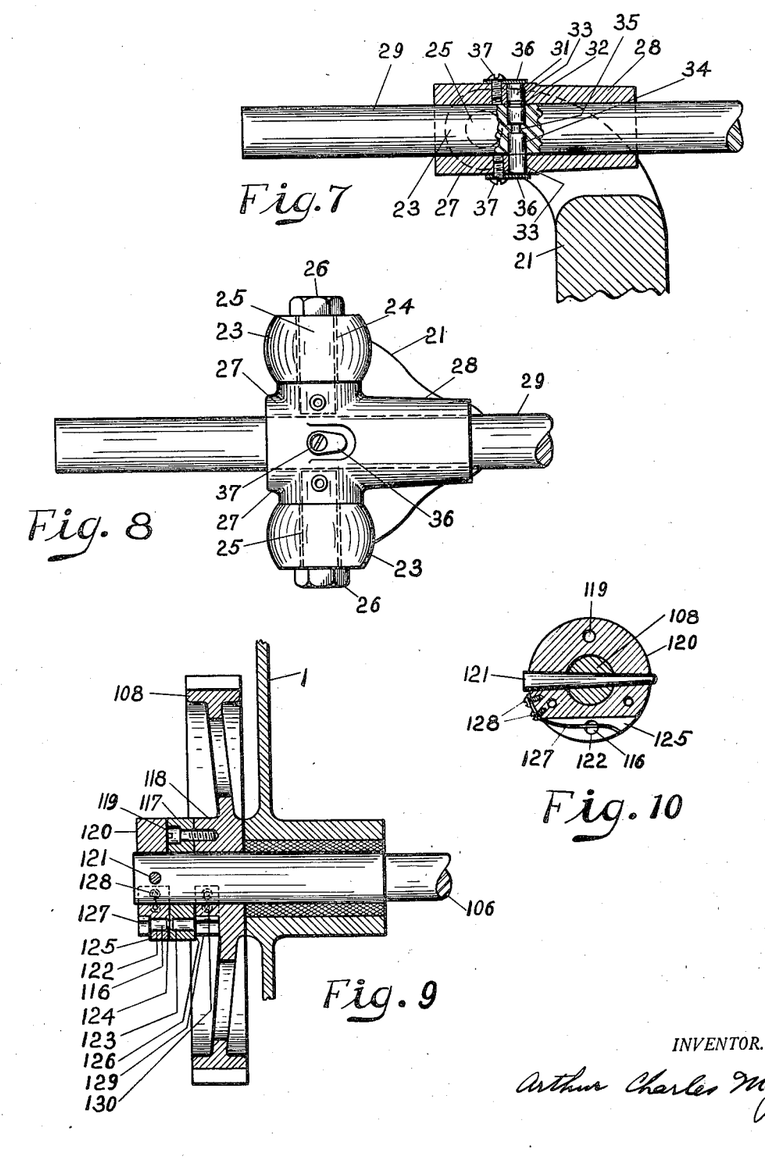
Fig. 7 is a vertical section of the safety device protecting the shutter.
Fig. 8 is a plan view of the part of the mechanism shown in Fig. 7.
Fig. 9 is a vertical longitudinal section of the safety device protecting all the moving parts of the machine.
Fig. 10 is a vertical front section of the parts shown in Fig. 9.

The power necessary to move the shutter 5 to and fro is extremely small, while the power required to drive the machine, and therefore also imparted to the lever 18 working the shutter 5, is comparatively very great. If any hard obstacle, say an iron scraper or piece of wood, drops accidentally into the dough to be divided and is caught by the shutter 5, it is most likely that either the shutter or the top of the lever or their connections will be damaged or broken by the force of the resistance to their powerful movement. Damages to such complicated machines as a dough divider are not so easily repaired and broken pieces can usually not be quickly obtained. A serious damage to the machine means always a long delay and is especially disastrous in a bakery, where the fermenting dough must be worked and handled immediately when ready, or the whole plan of baking the bread and delivering it to the customers breaks down. In order to avoid under all circumstances any serious consequences of any accident which could hurt the shutter, I connect the rod 29 to the tube 28 by means of a shear pin 31, the incision 32 of which is so deep that the pin breaks as soon as the resistance to the movement of the shutter 5 is greater than the power required for its ordinary work. For fixing the pin 31 in its due place, where its incision 32 is situated in the line where the outer circumference of the rod 29 and the inner circumference of the tube 30 meet, I provide the necessary holes in the walls of the latter and the rod 29, a contrivance for keeping the pin in its position and a way of access to the same, when it is to be removed, I preferably arrange for this purpose two holes 33 directly opposite to each other in the wall of the tube 28 and two corresponding holes 34 in the rod 29, connecting the two latter holes by a narrower opening 35 for giving access, when a shear pin, only one of which at a time is used in either of the two pairs of corresponding holes 33—34, is to be replaced. In order to hold the shear pin 29 in position in either hole, I employ the small plates 36 fixed to the tube 28 by the screws 37.

The front edge of the shutter 5 is shaped and sharp like a knife for easily cutting through the dough. In its forward stroke this front edge passes beyond the bottom opening of the hopper 2 against the extended bottom part 38 of the bar 39, covering the front end of the compression box 3 and carrying the front rim of the hopper 2, while the side rims of the latter are carried by the guides 17. It has proved not only advisable, but of the greatest advantage for the whole operation to lubricate the shutter 5 with an oil or fat suitable for the purpose and forming a valuable addition to the dough, the qualities of which it cannot alter in the extremely small quantities used. For this purpose I employ a long, channel-like receptacle 40 positioned at the back of the hopper 2, and extending across the same, and adapted to be filled with oil or fat. The shutter 5 as adapted to slide underneath the bottom of the receptacle, which is provided with spaced openings 41 suitable for the oil to seep through onto the top of the shutter. I preferably construct this oiling trough 40 of ribs 42 projecting from the two side walls of the hopper 2, a prolongation 43 of the bottom rim of the latter and a piece 44 connecting the ends of the ribs 42 and the prolongation 43.

The lower arm 20 of the lever 18 working the shutter 5 is provided at the side of its lower enlarged part with a pin, round which the roller 45, moving in the acting groove 46 of the cam 19, revolves, actuating the lever 18, when the latter is turned. The hub of the cam 19 is fixed to the shaft 47 rotatably mounted in the framework of the machine and driven by the gear wheel 48 fixed thereon.

The ram 6 consists of a box-like front part 49 and the guide shoes 50 provided at the back of the latter and is reciprocated in the dough compression box 3 by means of the lever 51 worked by the cam wheel 52 and weight 53. The lever 51 is composed of the lower straight arm 54 and two upper, parallel and preferably curved arms 55, one of curved arms 55 having a common hub with the straight arm 54; both the common hub and the hub of the second arm 55 are rigidly fixed on the rotatable shaft 22, the axis of which thus forms the fulcrum of the lever 51. Links 56, hinged at both ends, connect the upper ends of the two upper arms 55 with the ram 6. The hinges 57, provided for the purpose of connecting the links 56 with the ram 6, turn on short shafts 58 supported by brackets 59 situated between the guide shoes 50. The lower arm 54 of the lever 51 is fitted at its reenforced lower part with a pin on which the roller 60 is revolubly mounted, and at its end with a hook or the like, to which the rod, chain or wire rope 61, carrying the weight 53 is fastened. The roller 60 is so adapted and arranged as to travel on the rim of the cam wheel 52. The periphery of the cam is of such a shape, and its hub is fixed to the shaft 47 at such a point, that, when this shaft is revolving and that part of the periphery, farther away from the axis of the cam, turns upwards, the roller 60, pressed against the cam by the weight 53, which is thus lifted, rises together with the lower end of the lever 51, which thereby draws the ram 6 backward. In this way the machine power causes the backward stroke of the ram and the raising of the weight 53. When the opposite part of the periphery of the cam, or the part which is nearer to the axis of the cam turn upwards, the weight 53 draws the lower end of the lever 51 down and thus forces the ram 6 forward. The various parts of the lever mechanisms working the shutter 5 and the ram 6 are so calculated and arranged in regard to each other, that, while the weight 53 is in its highest position, the shutter 5 is drawn back, connecting the hopper 2 with the compression box 3, and the ram 6 on its backward stroke sucks dough from the hopper into the compression box. When the weight 53 descends, the shutter, moving forward, closes the top of the compression box 3 and forces the dough into the measuring cells 8. The pressure acting on the dough in the compression box 3 may be regulated, according to the qualities of its various kinds of dough to be divided, by adjusting the weight 53. Awkward side oscillations of the weight during its rise and fall may be prevented by providing along the path of the weight any suitable guiding devices. The above described devices and their special arrangement for operating a dough compression box are simple, easily controlled and regulated and most efficient.

The division block 7 is an oblong box having a lower solid part 62 containing the measuring cells 8, in this case eight in number and circular in cross section, and is reciprocated in a vertical direction before the open front end of the dough compression box 3, the cells 8 being in alignment therewith at the end of the upward stroke, and the guide plate 63 provided on top of the box 62 closing the compression box 3 on the downward stroke, at the end of which the measured dough pieces are discharged onto the conveyer 9.

The division block 7 is worked by the cam 64 and lever 65 composed of a single lower arm 66 and of two upper, corresponding arms 67, one at each side of the division block 7. One of the arms 67 has with the arms 66 a common hub, while the other one has a separate hub; both hubs are rigidly fixed on the shaft 68, which is rotatably mounted in the framework 1 and thus acts as fulcrum for the lever 65. The ends of the upper arms 67 are hinged to the sockets 69, into which the upright link rods 70 are screwed; the link rods 70 have collars 71 at their ends and are revolubly mounted on the protruding ends of the shaft 72 extending across the whole width of the block 7 and carried by brackets arranged at the sides of the block at corresponding points considerably above its center of gravity. The lower part of the arm 66 is enlarged to a boss carrying a pin extending sidewise from the arm, on which the roller 73 revolves, moving in the acting groove 74 of the cam 64. The hub of the cam 64 is fixed to the shaft 47, so that when the shaft revolves the lever 65 works the division block 7 up and down as required.

During these oscillations the vertical position of the division block 7 is firmly maintained by means of sets of guides 75 arranged at its sides and at the framework 1, so that the front surfaces of the block, consisting of those of its solid part 62 and its guide plate 63 glide always closely and smoothly along the stationary front surfaces of the bar 39, of the walls of the compression box 3 and of the plate 76 arranged underneath the latter so as to form a continuation of its front and fixed to or made of one piece with the framework 1. The plate 76 extends downwards, until its lower knife-like edge just covers the top wall of the solid box 62 closely above the cells 8, leaving the latter quite free, when the division block 7 is at the end of its downward stroke, and the cells are discharged. To lubricate these surfaces continuously sliding and rubbing on each other, is obviously of the greatest importance. To this end I provide in the top of the bar 39 a preferably curved recess 77 sloping towards its front and extending along the whole width of the compression box 3. The walls of the recess 77 and the guide plate 63 form a trough-like receptacle, for which purpose it is essential that, also at the lowest position of the division block 7, the top of the plate 63 is at least just as high as the top of the bar 39. An oil or fat placed in the thus formed receptacle will lubricate not only the moving guide plate 63 directly, but spread farther downwards by seeping through the interstice of its walls and by the downward movement of the guide plate.

The measuring cells 8 consist of the cylindrical chambers 78 of equal size in cross section, parallel to each other and extending from end to end of the block 7, and of the plungers 79 sliding closely, but easily therein; slightly less than the front half of the chambers 78 can be used for measuring the dough pieces, as the rest of the chambers is necessarily taken up by the plungers 79. The plungers are provided at their back end with stops 80, consisting of pins, bosses or the like, extending upwards and moving in corresponding slots or grooves 81 provided in the walls of the chambers 78 at their back end. The positions of the stops 80 and of the front ends of the slots 81 are so arranged, that, when the plungers 79 are pushed forward and are stopped by the stops 80 encountering the end of the slots 81, the flat front surfaces of the plungers 79 are flush with the front surface of the division block 7. The plungers 79 end at their back in comparatively long, narrowing and hollow necks 82 provided with screw threads meshing with the threads of the screws 83 ending in the small plates 84. The combined length of the plungers 79, their necks 82 and the protruding ends of the screws 83 must be such that the plates 84 are outside the chambers 78, when the front ends of the plungers 79 are flush with the front of the division block 7. When the plungers 79 are pushed out of the back of the chambers 78 by the dough entering the forward ends thereof, the small plates 84 encounter the stop plate 85 extending across the whole row. The position of the plate 85 is adjusted by means of the screw—and sleeve—arrangement 86, carried by the bracket-like projecting end of the framework 1, and regulates the distance to which the plungers 79 can be pushed back from the front surface of the block 7 by the dough forced into the cells 8, thus determining the size of the dough pieces to be produced. The screws 83 serve to adjust in the corresponding plungers the distance between the small plate 84 and the stop 80, by means of which uniformity in the size of dough pieces produced in the different chambers may be attained. The described arrangement for regulating the measuring cells so as to produce the required size of the dough pieces is simple and very effective, and may be easily manipulated, even by an unskilled man.

Figure 1:
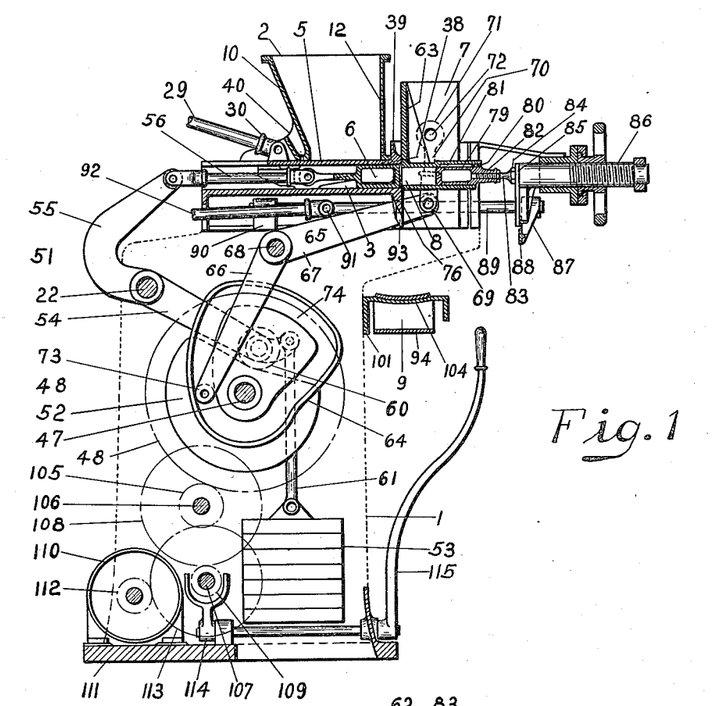
Fig. 1 is a longitudinal vertical section of the improved machine representing the ram, the shutter and the division block at the moment when its cells have been filled, and showing the general arrangement of the driving gear, and the cams regulating the movements of the ram and division block.
Figure 2:
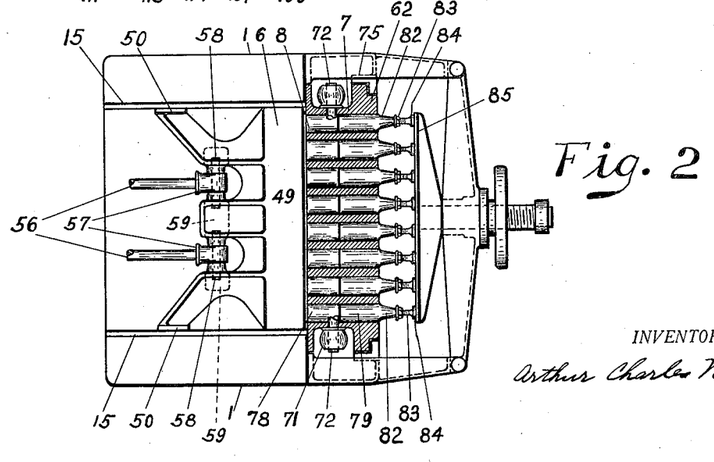
Fig. 2 is a sectional plan view showing the ram and division block in the same position as in Fig. 1.
Figure 3:
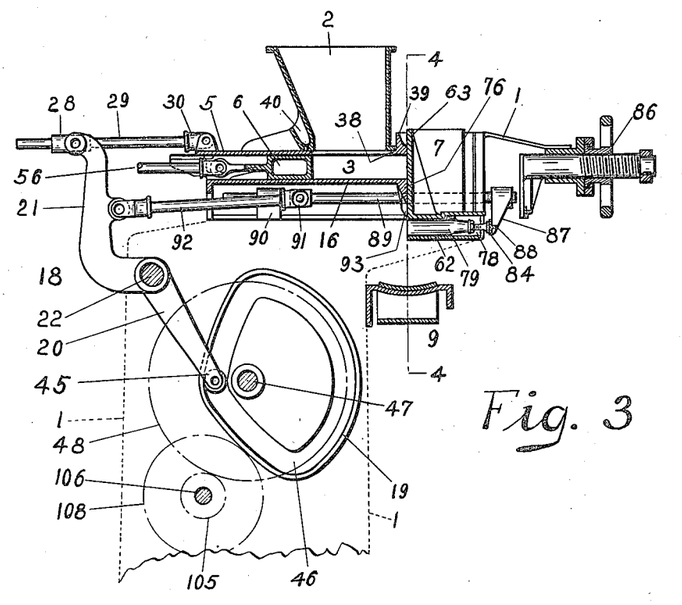
Fig. 3 is a longitudinal vertical section of a portion of the machine illustrating the positions of the ram, the shutter and the division block, when the cells have just been emptied of the measured dough pieces, and showing the cam and lever for operating the shutter, and the device for emptying the cells.
Figure 4:
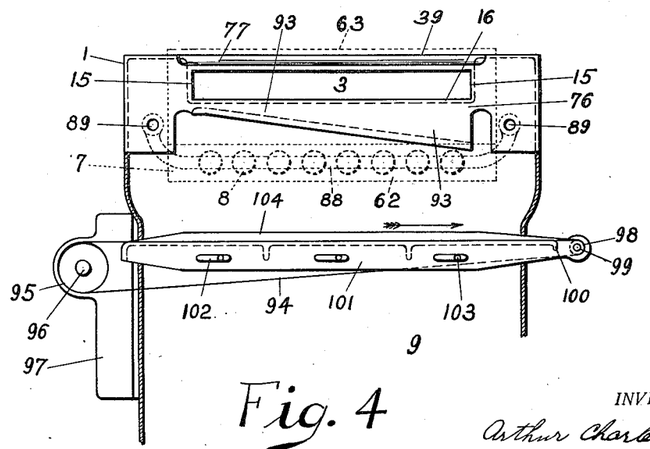
Fig. 4 is a section on line 4—4 of Fig. 3, showing the operating parts for the removal of the measured dough pieces from the cells and the machine.

The measured dough pieces are removed from the cells 8 at the end of the downward stroke of the division block 7 by means of the pusher 87 which is drawn forward, forcing the plungers 79 into the chambers 78, until the stops 80 encounter the ends of the slots 81. The pusher 87 consists of the horizontal bar 88 adapted to extend across the row of plates 84 when they are at their lowest position, as indicated in Fig. 2. The bar 88 is curved upwardly at its ends as shown in Fig. 4, and is rigidly connected to the horizontal rods 89 which are mounted so as to slide parallel to the plungers 79, in bearings provided in brackets or blocks 90 fixed to or forming one piece with the framework 1. The rods 89 are connected between two bearings by the cross rod 91 joined by the link 92, hinged at both ends, to the arm 21 of the lever 18 at a distance below the connection to the same of the shutter 5 corresponding to the difference between the length of the stroke of the shutter and that of the stroke of the pusher bar 88, the stroke of which is naturally much shorter than that of the shutter. The cam 64 and its groove 74 actuating the lever 65 reciprocating the division block 7 are so constructed and arranged that the division block is retained long enough at the end of the upward stroke for the cells 8 to be charged with dough, and also at the end of the downward stroke a sufficient time for the measured dough pieces to be discharged by the pusher 87.

The measured dough pieces, when pushed out of their cells 8 by the forward movement of the plungers 79, are prone—especially if not of a considerable weight—to adhere, if only for a few moments, to the front surfaces of the plungers and to the lower part of the front wall surrounding the cells of the division block 7. For this reason, the lower edge of the plate 76 is shaped as a knife or scraper 93, passing closely along these surfaces, and thus enabled to cut the dough pieces therefrom, when the division block 7 ascends again. The dough pieces dropping from the cells 8 arrive on the conveyer 9 very near to each other, so that they are liable to stick together. In order to avoid this disagreeable and disturbing occurrence, I arrange the knife 93 in an inclined position, rising from the top of the measuring cell 8 nearest to the discharge end of the conveyer 9 upwards at an angle of about 10° to above the cell at the opposite end of the row. The dough pieces drop thus successively on the moving conveyer 9, starting at its discharge end, and the distance of the dough pieces from each other is thereby increased. The distance between the individual dough pieces may be further increased by increasing the speed of the conveyer 9, and by regulating the speed of the conveyer a distance of the dough pieces from each other may be obtained, which is favorable for the work in the following machine, usually a rounder.

The form of conveyer 9 which I prefer comprises a canvas belt 94 which runs over two rollers 95 and 98. The larger roller 95 is mounted on a shaft 96 supported by a bracket 97 fixed to the side of the framework 1 and driven by any convenient means preferably from the driving shaft of the machine. The smaller roller 98 is rotatably mounted on a shaft 99 carried by a bracket 100 which is fitted at the end of a flat plate 101 fixed to the framework 1 at the front thereof. The plate 101 is provided with the elongated horizontal holes 102, and is fixed to the framework 1 by means of the screws 103 fitting through these holes; after loosening the screws 103 the plate 101 and the bracket 100 may be moved to either side in a horizontal direction, whereby the tension of the belt 94 may be adjusted. To facilitate the settling of the dough pieces on the carrying surface of the conveyer 9, the latter is placed below the division block as near the lowest position thereof as is convenient while remaining effective. A trough-like support 104, forming one piece with the plate 101, is provided, which serves to prevent any of the dough from dropping over the sides of the conveyer.

As has already been mentioned when describing the cams 19, 52 and 64, all three are fixed to the rotatable shaft 47 on which also the gear wheel 48 is rigidly mounted. The gear wheel 48 meshes with the gear wheel 105 fixed to the counter shaft 106 rotatably mounted in the framework 1 and driven from the shaft 107 by means of the gear wheel 108 mounted on the shaft 106 and the gear wheel 109 meshing therewith and fixed also to the shaft 107. The shaft 107 revolves in bearings contained in the framework 1 and is rotated by gearing connecting it with the electromotor 110 rigidly supported on the baseplate 111 of the machine. This gearing consists of the gear wheel 112 mounted on the shaft of the electromotor 110 and of the gear wheel 113 meshing therewith and adapted to be connected to and disconnected from the shaft 107, at the will of the operator, by means of the clutch mechanism 114 adapted to be operated by the handle bar 115.

As has already been mentioned above, damage to and breakage of a dough divider is especially disastrous for a bakery. I therefore provide means by which any of the leading gear wheels may be fixed to its shaft in such a manner that the connection will be broken and the wheel loosened as soon as the predetermined limit of power required by the machine under ordinary circumstances has been exceeded. For this purpose I preferably use the gear wheel 108, fixing it to the counter shaft 106 by means of a shear pin 116. (See Fig. 10.) The collar 117, loosely turning round the shaft 106 like the wheel 108, is fixed to a side of the hub 118 of the latter by the set screws 119. A similar collar 120 is arranged closely along the opposite side of the collar 117 and fixed to the shaft 106 by the pin 121. Corresponding holes 122 and 123 are provided in the collars 120 and 117 respectively, parallel to the shaft 106 and so constructed and arranged that the shear pin 116 extends through the two holes from end to end, and its incision 124, made according to the limit of power required, is situated in the plane in which the two collars 117 and 120 meet. so that, when this limit is exceeded, the shear pin 116 will break at the incision. A recess 125 in the collar 120, and a similar recess 126 in the hub 118 are provided for the removal of the shear pin 116, when necessary. A small curved spring plate 127, extending over one end of the shear pin 116 and fixed to the collar 120 by means of the screws 128, and a similar plate 129, reaching over the opposite end of the shear pin and fixed to the hub 118 by means of the screws 130, serve to hold the shear pin 116 in its proper position.

What I claim as new is—

1. In a machine of the class described, the combination with dough-cutting mechanism and mechanism for simultaneously dividing said dough into portions of predetermined size and weight, of means for discharging said portions from said mechanism arranged to effect the discharge of said portions in succession.

2. In a machine of the class described, the combination with a dough-compressing chamber, dough-cutting means forming one wall of said chamber at the end of the cutting stroke, a ram movable across said chamber, dough-dividing cells into which the dough is forced by said ram, a carrier for said cells movable transversely to the direction of movement of said ram to carry said cells simultaneously into discharging position, plungers operating simultaneously to discharge the formed dough from said cells, and a knife operating in succession upon the portions of dough discharged from said cells to complete the discharge of said portions as said cells are returned into dough-receiving position.

3. In a machine of the class described, the combination with a dough-receiving hopper and a dough-compressing chamber below said hopper, of a ram movable across said chamber, serving as one wall of said chamber when at one end of its stroke, and acting to suck the dough into said chamber when retreating from its compressing movement, a dough-cutting knife movable between said hopper and said chamber and serving as one wall of said chamber at the end of its cutting movement, and means for lubricating the upper surface of said knife.

4. In a machine of the class described, the combination with a dough-containing hopper, a dough-compressing chamber beneath said hopper, a dough cutting knife arranged to operate between said hopper and said chamber and serving as one wall of said chamber at the end of the cutting operation, a ram movable across said chamber beneath said knife, a series of dough receiving cells opposed to said ram and into which the dough is forced by said ram, a slide carrying said cells and movable transversely to the direction of movement of said ram, said slide having a face to close said chamber when said cells are moved into discharging position, and means comprising a lubricant containing receptacle of which a face forms one wall for lubricating said face.

5. In a machine of the class described, the combination with dough-compressing means, of means cooperating with said compressing means for simultaneously dividing the dough into a plurality of portions of predetermined size and weight, a conveyor for receiving said portions, and means for discharging said portions from said dividing means arranged to deposit said portions in succession upon said conveyor.

6. In a machine of the class described, the combination with dough-dividing means operating to simultaneously divide a mass of dough into a plurality of formed portions, of means for discharging the dough from said dividing means, comprising a knife arranged to engage and separate the formed portions of dough from said dividing means in succession.

7. In a machine of the class described, dough dividing and forming means comprising a series of cells, plungers operating simultaneously to force the formed portions of dough out of said cells, and a knife operating across the discharging ends of said cells and plungers to separate the adhering portions of dough therefrom, said knife and cells being relatively movable in such a manner that said knife engages the portions of dough in succession.

8. In a machine of the class described, dough-dividing and forming means comprising a slide provided with a plurality of dough receiving cells, cell charging mechanism into and out of operative relation to which said slide is adapted to move said cells, and means comprising a lubricant containing receptacle of which a face forms one wall for lubricating the face of said slide which moves over said cell charging mechanism.

9. In a machine of the class described, the combination with a dough-containing hopper and dough-compressing mechanism beneath said hopper, of a knife movable between said hopper and said mechanism to separate the dough in said mechanism from that in said hopper, and means extending transversely of said knife for lubricating during movements thereof that face of the knife upon which the dough in said hopper rests at the end of said separating operation.

10. In a dough-dividing machine, the combination with a hopper for the dough to be divided, a dough compression box beneath said hopper, and a shutter provided at its front with a knife-like edge and arranged to reciprocate between said hopper and said box, of a channel-like receptacle containing a suitable lubricating medium arranged upon that side of said hopper at which said shutter begins its dough-cutting movement, said receptacle having openings through the bottom thereof communicating with the upper face of said shutter for lubricating said shutter.

11. In a dough-dividing machine, the combination with a hopper for the dough to be divided, a dough-compression box beneath said hopper, a shutter provided at its front with a knife-like edge and arranged to reciprocate between said hopper and said box, and lateral guides for said shutter, of a channel-like receptacle containing a suitable lubricating medium arranged upon that side of said hopper at which said shutter begins its dough-cutting movement, said receptacle having openings through the bottom thereof communicating with the upper face of said shutter for lubricating said shutter and its guides.

12. In a dough-dividing machine, the combination with a hopper for the dough to be divided, a dough-compression box open at its front and located beneath said hopper, and a division block arranged to reciprocate across the open front of said box, of a part provided with a recess adjacent to and extending across the face of said block which reciprocates over said box, said recessed part forming with said block a lubricant containing channel for effecting the lubrication of said face of said block.

13. In a machine of the class described, dough-dividing and forming means comprising a slide provided with a plurality of dough-receiving cells, and cell charging mechanism into and out of operative relation to which said slide is adapted to carry said cells, of means for lubricating the face of said slide which moves over said cell charging mechanism comprising a member carried by said cell charging mechanism and having formed therein a recess constituting with the adjacent face of said slide a lubricant containing channel arranged to distribute lubricant across the face of the slide.

14. In a machine of the class described, dough-dividing and forming means comprising a slide provided with a plurality of dough-receiving cells, cell charging mechanism into and out of operative relation to which said slide is adapted to carry said cells and means for lubricating the face of said slide which moves over said cell charging mechanism comprising a member having its lower edge in contact with said slide and recessed above said edge to form with the adjacent face of said slide a lubricant containing channel for distributing the lubricant over the face of the slide.

15. In a machine of the class described, dough-dividing and forming means comprising a slide provided with a plurality of dough-receiving cells, cell charging mechanism for simultaneously charging said cells and into and out of operative relation to which said slide carries said cells, a moving conveyor located beneath said slide and upon which the formed pieces of dough from said cells are arranged to be discharged and means for effecting the discharge of said pieces from said simultaneously charged cells upon said conveyor in succession.

16. In a machine of the class described, dough-dividing and forming means comprising a vertically reciprocating slide provided with a plurality of dough-receiving cells, cell charging mechanism into and out of operative relation to which the vertical movements of said slide carry said cells, means for ejecting the formed pieces of dough from said cells at one end of the reciprocating movement of said slide, a moving carrier upon which said pieces of dough are adapted to be discharged and a knife having its edge substantially in the plane of the face of the said slide and oblique to the direction of movement thereof whereby said knife engages and separates the adhering formed pieces of dough from the face of said slide and discharges them in succession upon said conveyor.

17. In a machine of the class described, dough-dividing and forming means comprising a vertically reciprocating slide provided with a plurality of dough-receiving cells, cell charging mechanism into and out of operative relation to which the vertical movements of said slide carry said cells, means for ejecting the formed pieces of dough from said cells at one end of the reciprocating movement of said slide, a moving carrier upon which said pieces of dough are adapted to discharged and a knife having its edge substantially in the plane of the face of the said slide and oblique to the direction of movement thereof, whereby said knife engages and separates the adhering formed pieces of dough from the face of said slide and discharges them in succession upon said conveyor, the part of the edge of said knife first operating upon said dough pieces being at that end of said knife nearest the discharging end of said conveyor.

18. In a machine of the class described, in combination, a vertically reciprocating slide provided with a plurality of measuring cells arranged in a horizontal row across said slide, cell charging mechanism over the adjacent vertical face of which said slide carries said cells into and out of cell charging position, the cells being charged at the end of the upward stroke of said slide and discharged at the end of the downward stroke, means for ejecting the formed pieces of dough from said cells, a stationary knife extending across the row of cells, having its cutting edge pointing downwards, lying closely adjacent to the surface of said slide and oblique to the path of movement thereof, a horizontally moving conveyor arranged to receive the dough pieces discharged from said slide and moving lengthwise of said knife in a direction to pass the nearest part of the edge thereof first, whereby the movement of said conveyor increases at intervals between the successive pieces of dough on said conveyor effected by the successive dropping of the dough pieces by the action of the inclined edge of said knife.

ARTHUR CHARLES MAY.